US012777312B2

(12) United States Patent
Thompson et al.

(10) Patent No.: US 12,777,312 B2
(45) Date of Patent: Oct. 27, 2026

(54) WIRELESS COMMUNICATION SYSTEM WITH MOBILE SELF-HEALING

(71) Applicants: 3M INNOVATIVE PROPERTIES COMPANY, St. Paul, MN (US); RTX A/S Company, Nørresundby (DK)

(72) Inventors: Darin K. Thompson, Huntersville, NC (US); Graham Wilson, Flint (GB); Gareth D. Evans, Wrexham (GB); Klaus A. Pedersen, Aalborg (DK)

(73) Assignee: SCOTT TECHNOLOGIES, INC., Monroe, NC (US)

( * ) Notice: Subject to any disclaimer, the term of this patent is extended or adjusted under 35 U.S.C. 154(b) by 312 days.

(21) Appl. No.: 18/289,479

(22) PCT Filed: May 4, 2022

(86) PCT No.: PCT/IB2022/054092
§ 371 (c)(1),
(2) Date: Nov. 3, 2023

(87) PCT Pub. No.: WO2022/234462
PCT Pub. Date: Nov. 10, 2022

(65) Prior Publication Data

US 2024/0244402 A1 Jul. 18, 2024

Related U.S. Application Data

(60) Provisional application No. 63/184,467, filed on May 5, 2021.

(51) Int. Cl.

| | |
|---|---|
| ***H04W 4/08*** | (2009.01) |
| ***H04W 4/90*** | (2018.01) |
| ***H04W 84/20*** | (2009.01) |

(52) U.S. Cl.
CPC ............... *H04W 4/08* (2013.01); *H04W 4/90* (2018.02); *H04W 84/20* (2013.01)

(58) Field of Classification Search
CPC ................................. H04W 4/08; H04W 4/90
(Continued)

(56) References Cited

U.S. PATENT DOCUMENTS 9,485,631 B2 11/2016 Fraser
10,798,196 B1 10/2020 Gohil
(Continued)

FOREIGN PATENT DOCUMENTS

EP 2869659 5/2015

OTHER PUBLICATIONS

International Search Report for PCT International Application No. PCT/IB2022/054092, mailed on Aug. 12, 2022, 3 pages.

*Primary Examiner* — Maria El-Zoobi
(74) *Attorney, Agent, or Firm* — Weisberg I.P. Law, P.A.

(57) ABSTRACT

A method implemented in a first wireless unit of a plurality of wireless units of a first group. The method includes determining whether a second wireless unit of the first group is configured as the master of the first group. If the second wireless unit is configured as the master of the first group, the first wireless unit is configured as a slave and the first wireless unit is joined to the first group to communicate with the other wireless units. In addition, if the second wireless unit is not configured as the master of the first group, the first wireless unit is configured as the master of the first group and one of the first group is formed and the first group joined to communicate with the other wireless units. An apparatus is also provided.

16 Claims, 6 Drawing Sheets

(58) Field of Classification Search
USPC ........................................................ 455/404.1
See application file for complete search history.

(56) References Cited

U.S. PATENT DOCUMENTS

| | | | | |
|---|---|---|---|---|
| 2002/0044535 | A1 | 4/2002 | Tabata et al. | |
| 2005/0174796 | A1 | 8/2005 | Morvan et al. | |
| 2006/0132301 | A1 * | 6/2006 | Stilp | G08B 25/10<br>340/539.22 |
| 2006/0244624 | A1 * | 11/2006 | Wang | H05B 47/19<br>340/815.67 |
| 2007/0202907 | A1 * | 8/2007 | Shaffer | H04W 4/08<br>455/518 |
| 2008/0034053 | A1 * | 2/2008 | Dasenbrock | H04L 51/00<br>709/210 |
| 2010/0279725 | A1 * | 11/2010 | Muraoka | H04W 72/02<br>455/509 |
| 2011/0096628 | A1 | 4/2011 | Golparian | |
| 2014/0082041 | A1 * | 3/2014 | Kurihara | H04L 67/1097<br>709/201 |
| 2021/0083888 | A1 | 3/2021 | Lin et al. | |
| 2021/0337500 | A1 * | 10/2021 | Okano | G01S 19/05 |

* cited by examiner

WIRELESS COMMUNICATION SYSTEM WITH MOBILE SELF-HEALING

TECHNICAL FIELD

This disclosure relates to wireless communication networks, and in particular to wireless communication network arrangements with mobile self-healing base stations that may be based on, for example, a Digital Enhanced Cordless Telecommunications (DECT) technology.

INTRODUCTION

Existing Digital Enhanced Cordless Telecommunications (DECT) technology supports wireless communication between devices. A typical DECT configuration includes at least a wireless unit such as a phone (handset) and a corresponding fixed base station. The fixed base station is typically connected to a phone line, such as by a registered jack 11 (RJ-11) phone line connection provided at a wall outlet. The phone line provides phone service to the base station and consequently to the wireless unit. The wireless unit supports cordless communication with the fixed base station and vice versa. As such, the wireless unit can be removed from the base station, which allows a user of the wireless unit to communicate via the main base station and via the phone line without the need of a cord or a wired connection being attached to the wireless unit.

In addition, a DECT base station may support communication with more than one wireless unit, e.g., two wireless units communicating with the base station at a given time. For example, two users, each with a wireless unit communicating with the base station, may be on the same call via the fixed base station and out to the phone line at the same time. In this example, each user may listen and talk in the same call.

Current DECT systems require the use of the fixed base station. For example, when a wireless unit is sufficiently distanced from the fixed base station so that communication between the wireless unit and the fixed base station is degraded, interrupted, or terminated, the communication from the wireless unit cannot be established or maintained, unless the wireless unit is returned to an area sufficiently close to the base station to re-establish communication with the base station. In addition, if power is removed from the base station, cordless communication ceases, even if the wireless units are powered, e.g., with a charged battery. In other words, the fixed base station is a necessary component for DECT system to be able to provide communication to the cordless devices. As such, unpowered/damaged based station or cordless devices that travel away from the base station eventually cause the termination of communication between the cordless devices and the fixed base station.

Mobile wireless communication is critical for first responders, such as police officers, firefighters, and paramedics, when responding to an emergency. According to one example, an incident commander may want to communicate with deployed first responders who carry out commands from the incident commander in order to address the emergency. According to another example, firefighters or a group of firefighters moving from an area within the emergency site to a distanced area may want to communicate to each other to coordinate a response to a fire. Although DECT technology allows first responders to wirelessly communicate, current DECT technology uses a base station and requires the wireless units to be within a certain distance from the base station for the wireless units to communicate.

Therefore, utilizing current DECT technology for communication among first responders during an emergency that requires mobility can be problematic as distancing from a base station can cause first responders to be disconnected from other first responders.

SUMMARY

Some embodiments advantageously provide a method and system for communicating via a DECT system with mobile self-healing base stations.

In some aspects of the present disclosure, a method implemented in a first wireless unit of a plurality of wireless units of a first group is provided. Each of the plurality of wireless units support wireless communication at least with other wireless units and are configurable as one of a master and a slave. One wireless unit of the plurality of wireless units is configured as a master of the first group. The method includes determining whether a second wireless unit of the first group is configured as the master of the first group. If the second wireless unit is configured as the master of the first group, the first wireless unit is configured as a slave and the first wireless unit is joined to the first group to communicate with the other wireless units. In addition, if the second wireless unit is not configured as the master of the first group, the first wireless unit is configured as the master of the first group and one of the first group is formed and the first group is joined to communicate with the other wireless units.

In some embodiments, the method further includes assigning a wireless unit identification, ID, to each wireless unit of the plurality of wireless units of the first group and determining that a better master exists within the first group if the ID of one wireless unit of the plurality of wireless units of the first group is lower than the ID of the master of the first group. In other embodiments, the method further includes exchanging messages between the master and the better master to confirm an existence of the better master. In addition, the master is configured as a slave, the better master is configured as the master of the first group. In some embodiments, the method further includes forming a second group including a plurality of wireless units of the second group, configuring a first wireless unit of the plurality of wireless units of the second group as a master of the second group, and configuring a second wireless unit of the plurality of wireless units of the second group as a slave of the second group.

In other embodiments, forming the second group is triggered by at least two wireless units of the first group losing communication with the first group and splitting from the first group to form the second group. One wireless unit of the at least two wireless units becomes the first wireless unit of the plurality of wireless units of the second group, and the other wireless unit of the at least two wireless units becomes the second wireless unit of the plurality of wireless units of the second group.

In some embodiments, the method includes determining a total number of wireless units in the first group, determining a second group exists and a total number of wireless units in the second group, and joining at least a wireless unit of the first group to the second group if the total number of wireless units in the second group is greater than the total number of wireless units in the first group. In other embodiments, a third wireless unit is rejoined to the first group based at least on a predefined criterion, the third wireless unit having previously split from the first group.

In another aspect, a first wireless unit of a plurality of wireless units of a first group is provided. Each of the plurality of wireless units supports wireless communication at least with other wireless units. Each of the plurality of wireless units is configurable as either a master or a slave and one wireless unit of the plurality of wireless units is configured as a master of the first group. The wireless unit includes a processing circuitry that is configured to determine whether a second wireless unit of the first group is configured as the master of the first group. If the second wireless unit is configured as the master of the first group, the processing circuitry configures the first wireless unit as a slave and joins the first wireless unit to the first group to communicate with the other wireless units. If the second wireless unit is not configured as the master of the first group, the processing circuitry configures the first wireless unit as the master of the first group, and either forms the first group or joins the first wireless unit to the first group to communicate with the other wireless units.

In some embodiments, the processing circuitry is further configured to exchange messages between the master and the better master to confirm an existence of the better master, configure the master as a slave, and configure the better master as the master of the first group. In some other embodiments, the processing circuitry is further configured to form a second group including a plurality of wireless units of the second group, configure a first wireless unit of the plurality of wireless units of the second group as a master of the second group, and configure a second wireless unit of the plurality of wireless units of the second group as a slave of the second group.

In other embodiments, forming the second group is triggered by at least two wireless units of the first group losing communication with the first group and splitting from the first group to form the second group, one wireless unit of the at least two wireless units becoming the first wireless unit of the plurality of wireless units of the second group, and the other wireless unit of the at least two wireless units becoming the second wireless unit of the plurality of wireless units of the second group.

In some embodiments, the processing circuitry is further configured to determine a total number of wireless units in the first group, determine a second group exists and a total number of wireless units in the second group, and join at least a wireless unit of the first group to the second group if the total number of wireless units in the second group is greater than the total number of wireless units in the first group. In other embodiments, the processing circuitry is further configured to rejoin a third wireless unit to the first group based at least on a predefined criterion, the third wireless unit having previously split from the first group.

In some embodiments the first wireless unit and/or all of the plurality of wireless units are configured to support Digital Enhanced Cordless Telecommunications (DECT).

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
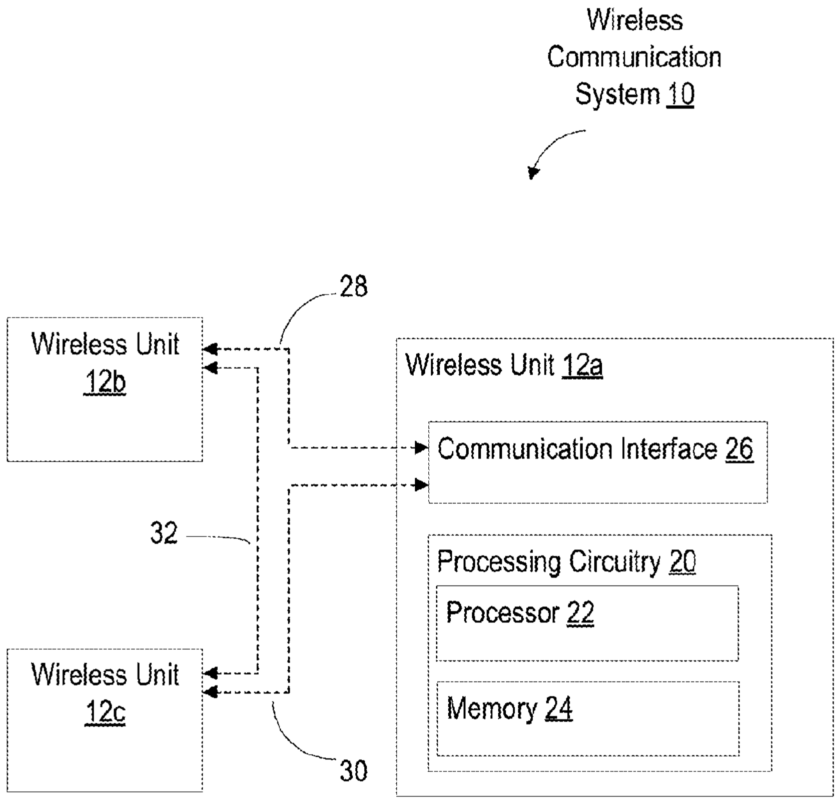
FIG. 1 is a schematic diagram of an example system according to the principles of the present disclosure.

In some embodiments, methods and apparatuses that support wireless communications, such as DECT communications, without the need for a fixed based station are provided, e.g., allowing for mobility without fixed base station. Note that methods and apparatuses described herein as supporting DECT communications may support a plurality of other wireless communication technologies. In other words, it is contemplated that methods and apparatuses described herein are not limited to DECT communications and, in fact, may be implemented using other wireless communication technologies.

In some embodiments, at least a wireless unit, which may be part of a group of wireless units, is provided. Each wireless unit in the group of wireless units may become and serve as a master and/or slave. In other words, each wireless unit device supports master and slave features, the master features and the slave features each being activated based on definable criteria. A wireless unit configured as a master may add and/or remove slaves to a group. A wireless unit configured as a slave communicates with the master at least to be added and/or removed from a group. A wireless unit that serves as a master is considered a base station, i.e., a mobile base station, as opposed to a fixed base station. A wireless unit that is not serving as a master is also mobile.

According to the principles of the present disclosure, each wireless unit may support at least the following: forming a group, dissolving a group, splitting from a group, joining a group, rejoining a group, and reforming a group. A group as used herein may be described in part as a set of wireless units. Each wireless unit of a group may be configured to communicate at least with another wireless unit of the other wireless units of the group. A subgroup may be described as a subset of a group and may or may not inherit at least a characteristic from the group. A subgroup may include at least one wireless unit from a group where the at least one wireless unit is either part of the group or not part of the group.

According to the principles of the present disclosure, forming a group may be described in part as at least two wireless units being part of a newly formed group. Dissolving a group may be described in part as removing from a group all the wireless units that form the group. Splitting from a group may be described in part as at least a unit from a formed group leaving the formed group to become part of another group/subgroup. Joining a group may be described in part as a wireless unit becoming part of a group/subgroup. Rejoining a group may be described in part as at least a wireless unit becoming part of a group which the wireless unit had previously joined. Reforming a group may be defined in part as forming a group including at least two wireless units which had previously been part of the same group.

As discussed below, if a wireless unit that is currently a master leaves a group, another wireless unit in the group of wireless units or a wireless unit not in the group may become the current master. If multiple wireless units are separated from the group and split into multiple groups, each group is adapted to include a master and may function as an independent group from the remaining groups. In some embodiments, when wireless units of the multiple groups return to an area within a predefined range, the separate groups may "self-heal" and rejoin into one group again. "Self-heal" may refer to at least a wireless unit and/or a subgroup and/or another group rejoining a group from which the wireless unit and/or the subgroup and/or the other group separated from. For example, if a group of 9 wireless units having a master, i.e., a first group with a master, separated into 3 sub-groups of 2 wireless units each and another sub-group of 3 wireless units, each sub-group may "self-heal" or rejoin the master of the first group. Each wireless unit that is a master of a sub-group may then revert to being a slave of the first group, i.e., being part of the first group again but not acting as a master. Each wireless unit of each sub-group that is not a master may rejoin the master of the first group as a slave. Therefore, in cases where the master of the first group is in the rejoined group, the master of the first group may regain master status, i.e., becomes the master of the rejoined group. Otherwise, any other wireless units that have rejoined the first group may become the master of the rejoined group.

In some embodiments, a wireless communication system that is mobile (i.e., not requiring a fixed base station or a fixed master) is provided. The wireless communication system has the capability to form groups and/or utilize channels while adapting to an ever-changing use model by allowing the groups at least to separate and reform. In other words, the present disclosure describes apparatuses and methods that are not limited to having a fixed base station and/or being limited to channel-only solutions, i.e., unable to create teams or groups of wireless units.

Before describing in detail exemplary embodiments, it is noted that the embodiments reside primarily in combinations of apparatus components and processing steps related to a DECT system with mobile self-healing base stations.

Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring to the drawing figures, in which like elements are referred to by like reference numerals, there is shown in FIG. 1 a schematic diagram of a wireless communication system 10 according to one or more embodiments. The wireless communication system 10 includes multiple wireless units, e.g., wireless units 12*a*-12*c* (collectively referred to as wireless units 12) where wireless unit 12*a* may be in direct communication with each of wireless units 12*b* and 12*c* such as via one or more of wireless and/or wired communication using one or more communication protocols. Similarly, wireless unit 12*b* may be in direct communication with wireless unit 12*c* such as via one or more of wireless and/or wired communication using one or more communication protocols.

Wireless unit 12 includes processing circuitry 20. The processing circuitry 20 may include a processor 22 and a memory 24. In particular, in addition to or instead of a processor, such as a central processing unit, and memory, the processing circuitry 20 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 22 may be configured to access (e.g., write to and/or read from) the memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, a wireless unit 12 may further include software stored internally in, for example, memory 24. The software may be executable by the processing circuitry 20. The processing circuitry 20 may be configured to control any of the methods and/or processes described herein and/or to cause such methods, and/or processes to be performed, e.g., by wireless unit 12. Processor 22 corresponds to one or more processors 22 for performing wireless unit 12 functions described herein. The memory 24 is configured to store data, programmatic software code and/or other information described herein. In some embodiments, the software may include instructions that, when executed by the processor 22 and/or processing circuitry 20, causes the processor 22 and/or processing circuitry 20 to perform the processes described herein with respect to wireless unit 12.

In addition, the wireless unit 12 may include a communication interface 26 configured to communicate at least with another wireless unit 12, e.g., 12 *b*, 12*c*, such as via one or more of wireless and/or wired communication using one or more communication protocols. More specifically, the communication interface 26 of the wireless unit 12*a* may communicate with the wireless unit 12*b* via communication link 28. In addition, the communication interface 26 of the wireless unit 12*a* may communicate with the wireless unit 12*c* via communication link 30. Similarly, the wireless unit 12*b* may communicate with the wireless unit 12*c* via communication link 32. Further, the wireless unit 12 is configured to communicate with the processing circuitry 20, the processor 22 and the memory 24, to perform the processes described herein with respect to wireless unit 12.

In some embodiments, the wireless communication system 10 includes at least a wireless unit 12 supporting a communication protocol, e.g., DECT, that provides for communication with other wireless units 12. Communication may include but is not limited to voice and/or data communication. A group of wireless units 12 includes at least two wireless units, e.g., 12*a* and 12*b*. Additional wireless units 12 may join the group of wireless units 12. A wireless unit 12 in a group may leave the group and join another group that is already formed, or may leave the group to form a new group. A splitting occurs when at least two wireless units 12 leave the group to form a new group which may be referred to as a subgroup, i.e., the new group/subgroup includes a subset of wireless units 12 that were part of the group. In addition, a wireless unit 12 may rejoin a group, which the wireless units 12 had previously joined. A subgroup can have the same features as a group, e.g., joining, splitting, forming, rejoining. Each feature of each wireless unit 12, e.g., joining, splitting, forming, rejoining, leaving a group, becoming a master/slave, may be performed automatically, semi-automatically, manually, remotely or locally. A group/subgroup may be mobile without losing communication among the group/subgroup members.

Each wireless unit 12 is configured at least to perform the role of a master and a slave, based on its role in a group. A slave communicates with a master at least to join a group/subgroup. A master may add and remove slaves from a group. In addition, wireless unit 12 corresponds at least to a user, also referred to as a member. A member may be a crew member or a crew leader. A crew leader in a group corresponds to the master in the group but may correspond to a slave. For example, a crew leader may carry a wireless unit 12 that is configured as the master and is joined by other crew members, each carrying a wireless unit 12 configured as a slave, to form a group, e.g., a group of members with a crew leader and at least a crew member. In another non-limiting example, a crew member may take the role of the crew leader, e.g., when the crew leader is lost or leaves the group. Furthermore, each wireless unit 12 of the group may communicate with each other wireless unit 12 in the group directly or indirectly.

Figure 2:
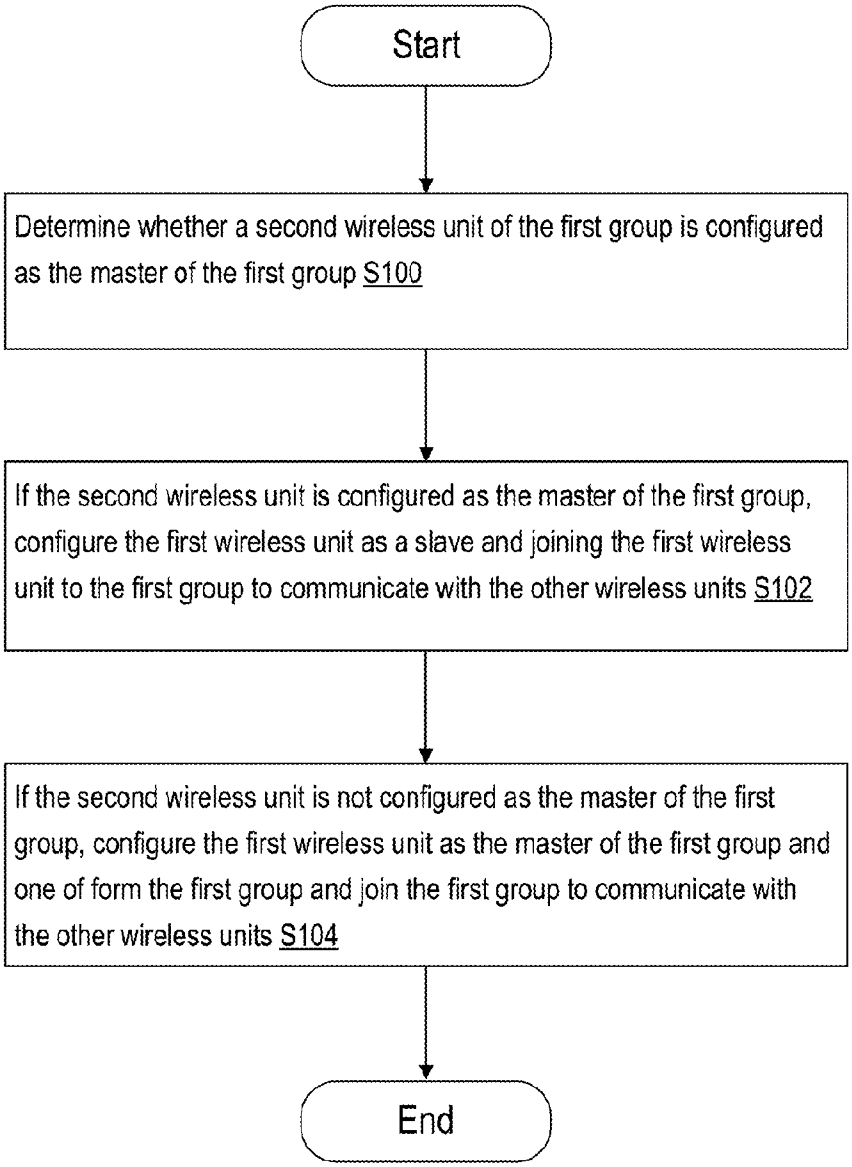
FIG. 2 is a flow chart of an example method according to the principles of the present disclosure.

FIG. 2 is a flow chart of an example method according to the principles of the present disclosure. The method includes determining whether a second wireless unit of the first group is configured as the master of the first group (Block S100). If the second wireless unit is configured as the master of the first group, the first wireless unit is configured as a slave and the first wireless unit is joined to the first group to communicate with the other wireless units (Block S102). If the second wireless unit is not configured as the master of the first group, the first wireless unit is configured as the master of the first group and one of the first group is formed and the first group is joined to communicate with the other wireless units (Block S104).

Figure 3:
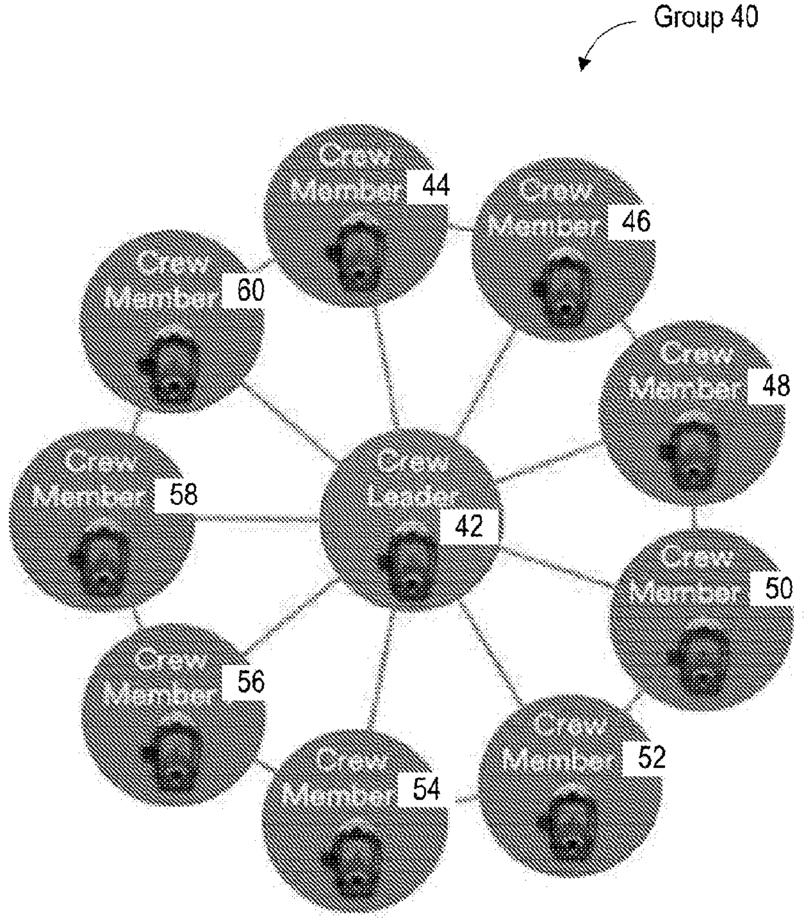
FIG. 3 illustrates an example of a group of crew members, each crew member having a wireless unit configured to communicate according to the principles of the present disclosure.
Figure 4:
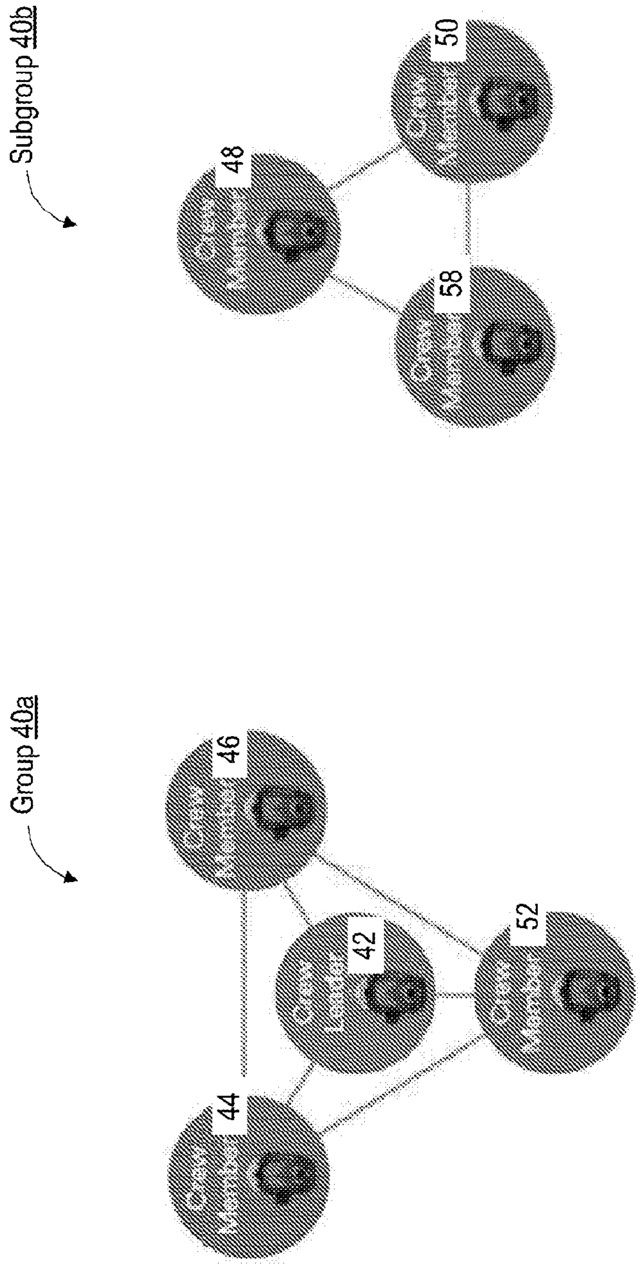
FIG. 4 illustrates an example of a group of crew members/leader and subgroup of crew members, each crew member/leader having a wireless unit configured to communicate according to the principles of the present disclosure.

FIGS. 3 and 4 are now referred to in order to explain a non-limiting process to form subgroups. FIG. 3 illustrates an example of a group of crew members, each crew member having a wireless unit 12 configured to communicate according to the principles of the present disclosure. A group 40 of wireless units 12 may include up to a predetermined number of active wireless units 12, e.g., ten in some embodiments, and at least one user/crew member per wireless unit 12. In the illustration in FIG. 3, the group 40 includes a crew leader 42 that is the master and nine crew members 44-60, i.e., slaves. Although the non-limiting example of the group of FIG. 3 includes ten wireless units 12 and a crew member/leader per wireless unit 12, the present disclosure is not limited to having a group with only ten wireless units 12 or having one crew member/leader per wireless unit 12. A group may have more than or fewer than ten wireless units 12, and each wireless unit 12 may correspond to more than one crew member/leader. One-to-all communication is supported, i.e., each crew member may be in communication with each of the remaining crew members in the group, e.g., without the need of communicating via the crew leader. Groups may be formed via touch pairing between a crew leader and a crew member, e.g., via NFC. The present disclosure is not limited to forming groups only via touch paring. Other methods of forming communication groups may be contemplated or utilized. In addition, groups may optionally have a definable minimum and/or maximum group capacity. Further, forming a group, dissolving a group, splitting from a group, joining a group, rejoining a group, and reforming a group, new member additions/deletions, continuous voice communication, and all other process performed according to the principles of the present disclosure may be provided via a wide range of communication technologies. One technology that may be employed is Dynamic DECT Mesh Communication. However, the present disclosure is not limited to Dynamic DECT Mesh Communication. Optionally, some wireless units 12 may be configured to be in listen-only mode.

FIG. 4 illustrates an example of a group of crew members/leader and subgroup of crew members, each crew member/leader having a wireless unit 12 configured to communicate according to the principles of the present disclosure. In this non-limiting example, a group 40*a* of crew leader 42 having a wireless unit 12 and crew members 44, 46, and 52, each having a wireless unit 12 and a subgroup 40*b* of crew members 48, 50, 58, each having a wireless unit 12, are shown. More specifically, the wireless unit 12 of some crew members have left group 40 (shown in FIG. 3), and now only the wireless units 12 of each of crew leader 42 and crew members 44, 46, and 52 remain as part of group 40*a*. The wireless unit 12 of crew members 48, 50, and 58, which split from group 40 (shown in FIG. 3), have formed subgroup 40*b*. Forming, reforming, dissolving, splitting, joining, and rejoining are discussed below in detail.

In some embodiments, at least a wireless unit 12 of a group or a group/subgroup of wireless units 12 may be configured to form or reform a group/subgroup, dissolve a group/subgroup, split from a group/subgroup, join or rejoin the group/subgroup, e.g., either automatically, semi-automatically, manually, remotely, or locally. Forming a group or subgroup may be based at least on a forming predefined criterion. Reforming a group or subgroup may be based at least on a forming predefined criterion. Dissolving a group or subgroup may be based at least on a dissolving predefined criterion. Splitting from a group or subgroup may be based at least on a splitting predefined criterion. Joining a group or subgroup may be based at least on a joining predefined criterion. Rejoining a group or subgroup may be based at least on a rejoining predefined criterion.

In some embodiments, predefined criteria, such as any of the forming predefined criterion, the reforming predefined criterion, the dissolving predefined criterion, the splitting predefined criterion, the joining predefined criterion, and the rejoining predefined criterion, may include a predefined radio frequency (RF) signal strength threshold. For example, reforming at least the subgroup may be based at least on a reforming predefined criterion, which may include at least a reforming predefined radio frequency (RF) signal strength threshold, e.g., if another, e.g., prior, better master is found, such as based on reaching a predefined radio frequency (RF) signal strength. Each of the predefined criteria may be the same or different. It is contemplated that criteria other than signal strength can be used to determine whether to and/or how to perform forming a group, dissolving a group, splitting from a group, joining a group, rejoining a group, and reforming a group. A non-limiting example of criteria other than signal strength is using bit error rates. Communication is maintained at least among wireless units 12 of a group while forming a group, dissolving a group, splitting from a group, joining a group, rejoining a group, and reforming a group.

In a nonlimiting example, the predefined RF signal strength threshold may be a numerical value, e.g., 3, corresponding to an RF signal strength within a predetermined range, e.g., 1-10. The numerical value and/or the predetermined range may be given in any units associated with signal strength. In another nonlimiting example, the predefined RF signal strength threshold may be a word, a combination of words, or an alphanumeric combination, corresponding to an RF signal strength, e.g., low, medium, high. The predefined RF signal strength threshold may correspond to or indicate a distance, such as a distance from a group or from another wireless unit 12, in which the wireless unit 12 is caused to separate from a group or caused to join a group. For example, changing the predefined RF signal strength threshold, e.g., from 1 to 3, or from low to high, may increase the distance of the wireless unit 12 from the group that causes the wireless unit 12 to separate from the group or join another group. However, changing the predefined RF signal strength threshold is not limited to the examples given, and may be changed to any value, word, combination of words, alphanumeric combination, to be within any range, to be given in any units or unitless, and may correspond to an increase or decrease in any other value/distance.

A member may have different roles and access to features at least based on whether the member is a crew leader/member and/or whether the wireless unit 12 of the member is configured as master or a slave. Non-limiting examples of roles and features are as follows. A crew leader may form crew talk groups, may issue and store crew member identifications (IDs), and may have access to talk and listen functions. A crew member may be an active member of a group, e.g., crew talk group, may be added to a group, such as via facepiece touch pairing with a crew leader, may receive group member information from a group leader, and may have access to talk and listen functions. As a non-limiting example, a group can be configured to include up to a predefined number of active members, e.g., nine active members.

Figure 5:
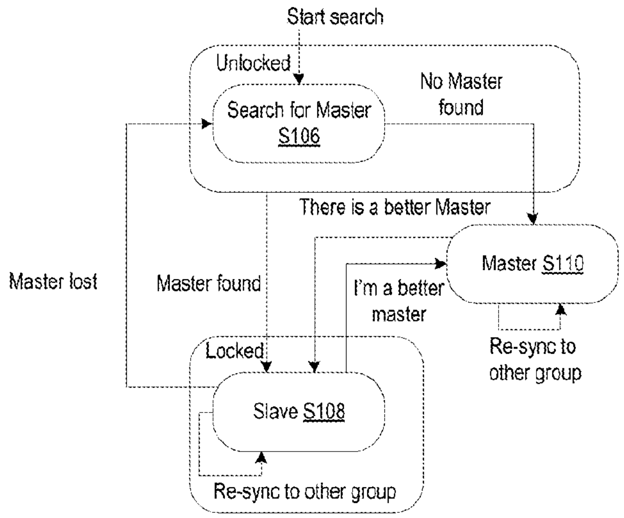
FIG. 5 illustrates a flow chart of an example method according to the principles of the present disclosure.

FIG. 5 is a flow chart of an example method according to the principles of the present disclosure. A wireless unit 12 may be locked or unlocked. A wireless unit 12 is considered to be locked when the wireless unit 12 is joined to a group of wireless units 12 (e.g., a group with a master) and considered unlocked when the wireless unit 12 is not joined to the group. An unlocked wireless unit 12 may search for a master (Block S106) in a group. If a master is found, the unlocked wireless unit 12 that is searching for a master becomes a slave (Block S108) that is locked. If no master is found, the unlocked wireless unit 12 that is searching for a master becomes the master (Block S110). When a slave has lost a master, the slave becomes an unlocked wireless unit 12 searching for a master (Block S106). Each wireless unit 12 has a unit ID and may determine whether another wireless unit 12 is a better master and available as a new master. A unit ID may include numbers, letters, characters, or a combination thereof. The better master determination may be based at least on the unit ID of the wireless unit 12 and the unit ID of the better master, e.g., based on simple arbitration. The better master may be the wireless unit 12 with the lowest unit ID. Further, each wireless unit 12 may a perform re-synchronization process to determine whether to synchronize with a group that is different from the group where the wireless unit 12 is currently synchronized. For example, the wireless unit 12 may determine to synchronize with another group if a number of members of the other group is larger than the number of members of the current group and signal strength of the other group is greater or equal than a predefined threshold.

The unit ID of the wireless unit 12 may be determined based at least in part on information associated with a group/subgroup, a master, and/or the wireless unit 12. In a non-limiting example, the unit ID may be determined based on information associated with a master of a group from which the wireless unit 12 separated. The unit ID may also be determined based on a process of tagging in, in which a wireless unit 12 requests the master to join a group. In addition, a list of IDs may be created and/or stored. For example, a wireless unit 12 that is a master may hold a list of unit IDs, each ID of the list corresponding to a wireless unit 12 of the group. Further, the wireless unit 12 that is a master may propagate information associated with the list, including the unit IDs, to the wireless units 12 of the of the group that are not the master. According to one embodiment, the propagation may be over time, where parts of the list are propagated at different times.

Figure 6:
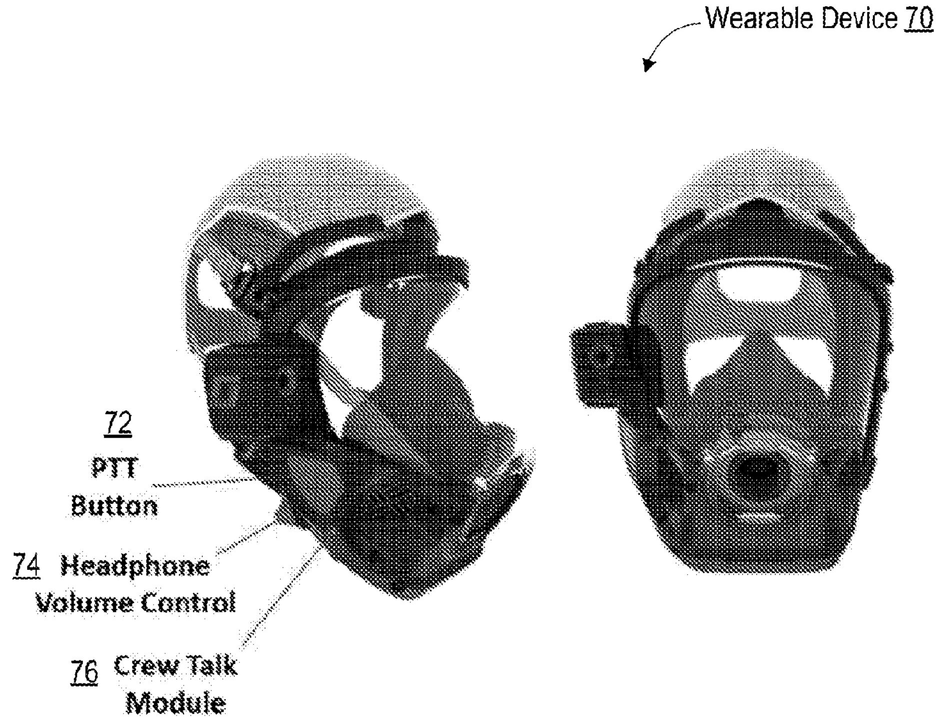
FIG. 6 illustrates an example wearable device incorporating a communication device that performs the methods according to the principles of the present disclosure.

FIG. 6 illustrates an example wearable device 70 incorporating at least a wireless unit 12 that performs the methods according to the principles of the present disclosure. Non-limiting examples of wearable device 70 include wearable devices for first responders such as a helmet, a mask, a face seal, a head net, a respirator, a facepiece, etc. The wireless unit 12 may be interoperable with radio direct interface (RDI) and/or bone transducer headphones and/or near field communication (NFC) assisted grouping of wireless units. In other embodiments, a custom DECT protocol may be utilized. A custom DECT protocol as referred to herein may include, but is not limited to, an ability to break a group into multiple sub-groups and automatically generate a "master" for each subgroup. In addition, or in the alternative, other communication features such as advanced DECT receiver and/or voice activity detection (VAD) and/or push to talk (PTT) 72 and/or headphone volume control 74 and/or crew talk module 76 may be utilized. Signal strength and frequency/channels used for communication, e.g., among wireless units 12, may be configurable. In addition, full duplex voice and voice prompts are supported. Other features include at least a PTT button, headphone volume control, and/or a crew talk module.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A method implemented in a first wireless unit of a plurality of wireless units of a first group, each of the plurality of wireless units supporting wireless communication at least with other wireless units, each of the plurality of wireless units being configurable as one of a master and a slave, one wireless unit of the plurality of wireless units being configured as a master of the first group, the method comprising:

determining whether a second wireless unit of the first group is configured as the master of the first group;

if the second wireless unit is configured as the master of the first group, configuring the first wireless unit as a slave and joining the first wireless unit to the first group to communicate with the other wireless units;

if the second wireless unit is not configured as the master of the first group, configuring the first wireless unit as the master of the first group and one of forming the first group and joining the first wireless unit to the first group to communicate with the other wireless units;

assigning, to each of the plurality of wireless units of the first group a respective wireless unit identification (ID);

determining whether a replacement master exists within the first group based on a predefined criterion, the predefined criterion including that a wireless unit of the first group is in communication with the master at a radio frequency (RF) signal strength satisfying a predefined RF signal strength threshold and has an ID lower than an ID of the master of the first group;

selecting, as the replacement master, a wireless unit having a lowest ID among wireless units of the first group that satisfy the predefined criterion;

exchanging messages between the master and the replacement master to confirm existence of the replacement master;

configuring the master as a slave; and configuring the replacement master as the master of the first group.

2. The method of claim 1, further including:

forming a second group including a plurality of wireless units of the second group;

configuring a first wireless unit of the plurality of wireless units of the second group as a master of the second group; and configuring a second wireless unit of the plurality of wireless units of the second group as a slave of the second group.

3. The method of claim 2, wherein forming the second group is triggered by at least two wireless units of the first group losing communication with the first group and splitting from the first group to form the second group, one wireless unit of the at least two wireless units becoming the first wireless unit of the plurality of wireless units of the second group, and the other wireless unit of the at least two wireless units becoming the second wireless unit of the plurality of wireless units of the second group.

4. The method of claim 1, further including:

determining a total number of wireless units in the first group;

determining a second group exists and a total number of wireless units in the second group; and joining at least a wireless unit of the first group to the second group if the total number of wireless units in the second group is greater than the total number of wireless units in the first group.

5. The method of claim 1, further including:

rejoining a third wireless unit to the first group based at least on a predefined criterion, the third wireless unit having previously split from the first group.

6. The method of claim 1, wherein the plurality of wireless units support Digital Enhanced Cordless Telecommunications (DECT).

7. A first wireless unit of a plurality of wireless units of a first group, each of the plurality of wireless units supporting wireless communication at least with other wireless units, each of the plurality of wireless units being configurable as one of a master and a slave, one wireless unit of the plurality of wireless units being configurable as a master of the first group, the wireless unit comprising:

processing circuitry configured to:

determine whether a second wireless unit of the first group is configured as the master of the first group;

if the second wireless unit is configured as the master of the first group, configure the first wireless unit as a slave and join the first wireless unit to the first group to communicate with the other wireless units;

if the second wireless unit is not configured as the master of the first group, configure the first wireless unit as the master of the first group and one of form the first group and join the wireless unit to the first group to communicate with the other wireless units;

assign to each wireless unit of the plurality of wireless units of the first group, a respective wireless unit identification (ID);

determine whether a replacement master exists within the first group based on a predefined criterion, the predefined criterion including that a wireless unit of the first group is in communication with the master at a radio frequency (RF) signal strength satisfying a predefined RF signal strength threshold and has an ID lower than an ID of the master of the first group;

exchange messages between the master and the replacement master to confirm an existence of the replacement master;

configure the master as a slave; and configure the replacement master as the master of the first group.

8. The first wireless unit of claim 7, the processing circuitry being further configured to:

form a second group including a plurality of wireless units of the second group;

configure a first wireless unit of the plurality of wireless units of the second group as a master of the second group; and configure a second wireless unit of the plurality of wireless units of the second group as a slave of the second group.

9. The first wireless unit of claim 8, wherein forming the second group is triggered by at least two wireless units of the first group losing communication with the first group and splitting from the first group to form the second group, one wireless unit of the at least two wireless units becoming the first wireless unit of the plurality of wireless units of the second group, and the other wireless unit of the at least two wireless units becoming the second wireless unit of the plurality of wireless units of the second group.

10. The first wireless unit of claim 7, the processing circuitry being further configured to:

determine a total number of wireless units in the first group;

determine a second group exists and a total number of wireless units in the second group; and join at least a wireless unit of the first group to the second group if the total number of wireless units in the second group is greater than the total number of wireless units in the first group.

11. The first wireless unit of claim 7, the processing circuitry being further configured to:

rejoin a third wireless unit to the first group based at least on a predefined criterion, the third wireless unit having previously split from the first group.

12. The first wireless unit of claim 7, wherein the first wireless unit is configured to support Digital Enhanced Cordless Telecommunications (DECT).

13. A method implemented in a first wireless unit of a plurality of wireless units of a first group, each of the plurality of wireless units supporting wireless communication at least with other wireless units, each of the plurality of wireless units being configurable as one of a master and a slave, one wireless unit of the plurality of wireless units being configured as a master of the first group, the method comprising:

determining whether a second wireless unit of the first group is configured as the master of the first group;

if the second wireless unit is configured as the master of the first group, configuring the first wireless unit as a slave and joining the first wireless unit to the first group to communicate with the other wireless units;

if the second wireless unit is not configured as the master of the first group, configuring the first wireless unit as the master of the first group and one of forming the first group and joining the first group to communicate with the other wireless units;

forming a second group including a plurality of wireless units of the second group;

configuring a first wireless unit of the plurality of wireless units of the second group as a master of the second group; and configuring a second wireless unit of the plurality of wireless units of the second group as a slave of the second group, wherein forming the second group is triggered by at least two wireless units of the first group losing communication with the first group and splitting from the first group to form the second group, one wireless unit of the at least two wireless units becoming the first wireless unit of the plurality of wireless units of the second group, and the other wireless unit of the at least two wireless units becoming the second wireless unit of the plurality of wireless units of the second group.

14. The method of claim 13, further including:

determining a total number of wireless units in the first group;

determining a second group exists and a total number of wireless units in the second group; and joining at least a wireless unit of the first group to the second group if the total number of wireless units in the second group is greater than the total number of wireless units in the first group.

15. The method of claim 13, further comprising:

rejoining a third wireless unit to the first group based at least on a predefined criterion, the third wireless unit having previously split from the first group.

16. The method of claim 13, wherein the plurality of wireless units support Digital Enhanced Cordless Telecommunications (DECT).

* * * * *